(12) United States Patent
Ersoy et al.

(10) Patent No.: US 6,553,864 B1
(45) Date of Patent: Apr. 29, 2003

(54) ACTUATOR PEDAL FOR THE BRAKE SYSTEM OF ROAD VEHICLE

(75) Inventors: Metin Ersoy, Walluf (DE); Waldemar Rogowski, Osnabrük (DE); Keit Wagener, Bissendorf (DE)

(73) Assignee: ZF Lemförder Metallwaren AG (DE)

( * ) Notice: Subject to any disclaimer, the term of this patent is extended or adjusted under 35 U.S.C. 154(b) by 0 days.

(21) Appl. No.: 09/743,616
(22) PCT Filed: May 3, 2000
(86) PCT No.: PCT/DE00/01371
§ 371 (c)(1),
(2), (4) Date: Jan. 10, 2001
(87) PCT Pub. No.: WO00/68050
PCT Pub. Date: Nov. 16, 2000

(30) Foreign Application Priority Data

May 11, 1999 (DE) .......................... 199 21 552

(51) Int. Cl.[7] ................................................. G05G 1/14
(52) U.S. Cl. .................... 74/512; 74/563; 74/473.16
(58) Field of Search ............................. 74/563, 473.16, 74/512

(56) References Cited

U.S. PATENT DOCUMENTS

| | | | | | |
|---|---|---|---|---|---|
| 3,921,750 A | * | 11/1975 | Shames | ..... | 180/271 |
| 4,009,623 A | * | 3/1977 | Smith | ..... | 180/271 |
| 4,047,731 A | * | 9/1977 | VanAuken | ..... | 138/172 |
| 4,318,879 A | * | 3/1982 | Gartner | ..... | 264/163 |
| 5,224,588 A | * | 7/1993 | Cook | ..... | 200/327 |
| 5,485,764 A | * | 1/1996 | Sugimoto et al. | ..... | 188/2 D |
| 5,520,068 A | * | 5/1996 | Karch | ..... | 74/512 |
| 5,534,672 A | * | 7/1996 | Meagher | ..... | 200/61.89 |
| 5,555,773 A | * | 9/1996 | Nanno et al. | ..... | 74/512 |
| 5,609,069 A | * | 3/1997 | Swenson | ..... | 74/560 |
| 5,611,249 A | * | 3/1997 | Perisho et al. | ..... | 74/501.5 R |
| 5,812,050 A | * | 9/1998 | Figgins | ..... | 123/396 |
| 5,929,407 A | * | 7/1999 | Ziem | ..... | 200/16 B |
| 6,070,492 A | * | 6/2000 | Beil | ..... | 74/482 |
| 6,112,615 A | * | 9/2000 | Nawata et al. | ..... | 180/274 |
| 6,155,385 A | * | 12/2000 | Basnett | ..... | 188/196 V |
| 6,204,463 B1 | * | 3/2001 | Stringos | ..... | 200/296 |
| 6,279,417 B1 | * | 8/2001 | Mizumz et al. | ..... | 180/274 |
| 6,318,208 B1 | * | 11/2001 | Thongs et al. | ..... | 74/513 |
| 6,336,376 B1 | * | 1/2002 | Lee | ..... | 180/274 |
| 6,339,971 B1 | * | 1/2002 | Kato | ..... | 180/274 |
| 2001/0047695 A1 | * | 12/2001 | Ichiba | ..... | 74/512 |

* cited by examiner

Primary Examiner—David A. Bucci
Assistant Examiner—Julie K. Smith
(74) Attorney, Agent, or Firm—McGlew and Tuttle, P.C.

(57) ABSTRACT

An actuating pedal (1) for the brake system of a road vehicle has a fastening device (6) for fixing the actuating pedal (1) in a pivot bearing (12) on a pedal block (7) of the vehicle. The pedal block is a rigid part of the body, with a pedal body (2) and with an actuating surface (3). The pedal body (2) has at least one inner metal core (8) and a plastic jacketing (9) surrounding the metal core (8).

12 Claims, 2 Drawing Sheets

ACTUATOR PEDAL FOR THE BRAKE SYSTEM OF ROAD VEHICLE

FIELD OF THE INVENTION

The present invention pertains to an actuating pedal for the brake system of a road vehicle with a fastening device for fixing the actuating pedal in a pivot bearing on a pedal block of the vehicle, which said pedal block is a rigid part of the body, with a connection device to a brake power booster module, with a pedal body, and with an actuating surface.

BACKGROUND OF THE INVENTION

Actuating pedals of this class described in the introduction have been used in utility vehicles and motor vehicles for a long time. The actuating pedals have to meet high requirements concerning strength and the rigidity of the connection, and it should be borne in mind that extremely high forces are applied to the actuating pedal especially in panic or full braking situations.

In addition, high torsional rigidity is also desirable and necessary because a direct, good feeling of braking shall be provided at any time for the driver of the vehicle during the application of the actuating pedal.

Based on these requirements, all the actuating pedals used at present are made of steel without exception. Such a component is usually manufactured from a steel sheet, and the entire manufacturing process comprises a plurality of shaping processes and additional components, e.g., for mounting restoring springs or for actuating limit switches, are welded to the pedal body as a basic sheet metal part. The number of individual processing steps makes the production of actuating pedals of this class particularly expensive compared with other vehicle components despite automation engineering, because a final surface treatment in the form of a paint coating is usually additionally performed after the end of the shaping operation proper. In addition, the actuating pedals used in the prior art have the serious drawback that they have a relatively heavy weight because of their design, which may have a disadvantageous effect especially in case of an accident.

SUMMARY AND OBJECTS OF THE INVENTION

The object of the present invention is therefore to provide an actuating pedal of the type described in the introduction, which avoids the drawbacks of prior-art actuating pedals as known from the prior art. In particular, considerable cost savings shall be achieved in production. Moreover, the feeling of actuation during the braking operation shall be further optimized.

According to the present invention, an actuating pedal (1) for the brake system of a road vehicle is provided with a fastening device for fixing the actuating pedal in a pivot bearing on a pedal block of the vehicle. The pedal block is a rigid part of the body, with a pedal body and with an actuating surface. The pedal body has at least one inner metal core and a plastic jacket surrounding the metal core.

The design features of the actuating pedal according to the present invention ensure, on the one hand, the torsional rigidity and the high break loadability of the actuating pedal due to the use of an inner metal core and, in addition, the plastic jacketing makes possible an optimized shaping of the actuating pedal, and the entire manufacturing process can be carried out especially inexpensively by means of the hybrid technology. A large number of manufacturing steps are eliminated within the framework of the production and the final surface treatment of the actuating pedal according to the present invention is no longer necessary.

It is particularly advantageous for the fastening device for fixing the actuating pedal on a bracket which is a rigid part of the body to be made in one piece with the plastic jacketing within the framework of the jacketing of the metal core. The mounting points necessary for the pivoting of the actuating pedal can be integrated in the jacketing without problems according to the plastics injection molding technique.

Moreover, another advantage of the present invention is that additional attached elements, e.g., for the actuation of a brake light switch or the attachment of spring-restoring mechanisms can be integrated in the plastic jacketing without problems. Based on the unique shape, no additional special process and production steps are necessary for this for the injection operation for preparing the plastic jacketing.

It also proved to be expedient to design the metal core as a steel sheet core of a simple shape, which can be manufactured within the framework of an uncomplicated shaping operation. PA(Polyamide) 6 or PA 6.6/GF (glass fiber) is preferably used as the material for the plastic jacketing. In addition, the actuating surface can be applied to the pedal body by injection molding according to the two-component process, and the actuating surface receives a top layer consisting of polyurethane.

The design of the pedal body according to the present invention also makes it possible to provide the fastening device of the actuating pedal with a pin element, which has at its free end facing away from the fastening device at least one spring-tensioned pressure roller, which rolls on a corresponding curved path on the pedal block which is a rigid part of the body during the pivoting of the actuating pedal around the pivot mounting point of the fastening device. The curved path on the pedal block can be adapted correspondingly depending on the desired direction of the forces for returning the pedal, so that an optimal feeling of actuation is obtained for the driver of the vehicle. Moreover, the curved path may be designed such that the actuating pedal will be automatically free from clearance after the installation despite existing manufacturing tolerances, so that an immediate braking effect is guaranteed during the actuation of the brake system.

Moreover, it proved to be particularly advantageous for the pedal body to have an elongated hole, in which a connecting rod of the connection device is arranged displaceably, at the point at which the pedal body cooperates with the connection device to the brake power booster module. The design of the elongated hole causes an unlimited straight-line motion of the connecting rod, so that an additional ball-and-socket joint for providing additional degrees of freedom during the movement of the actuating rod may be eliminated. In addition, the pedal angle can be made greater and the length of the pedal can be reduced. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
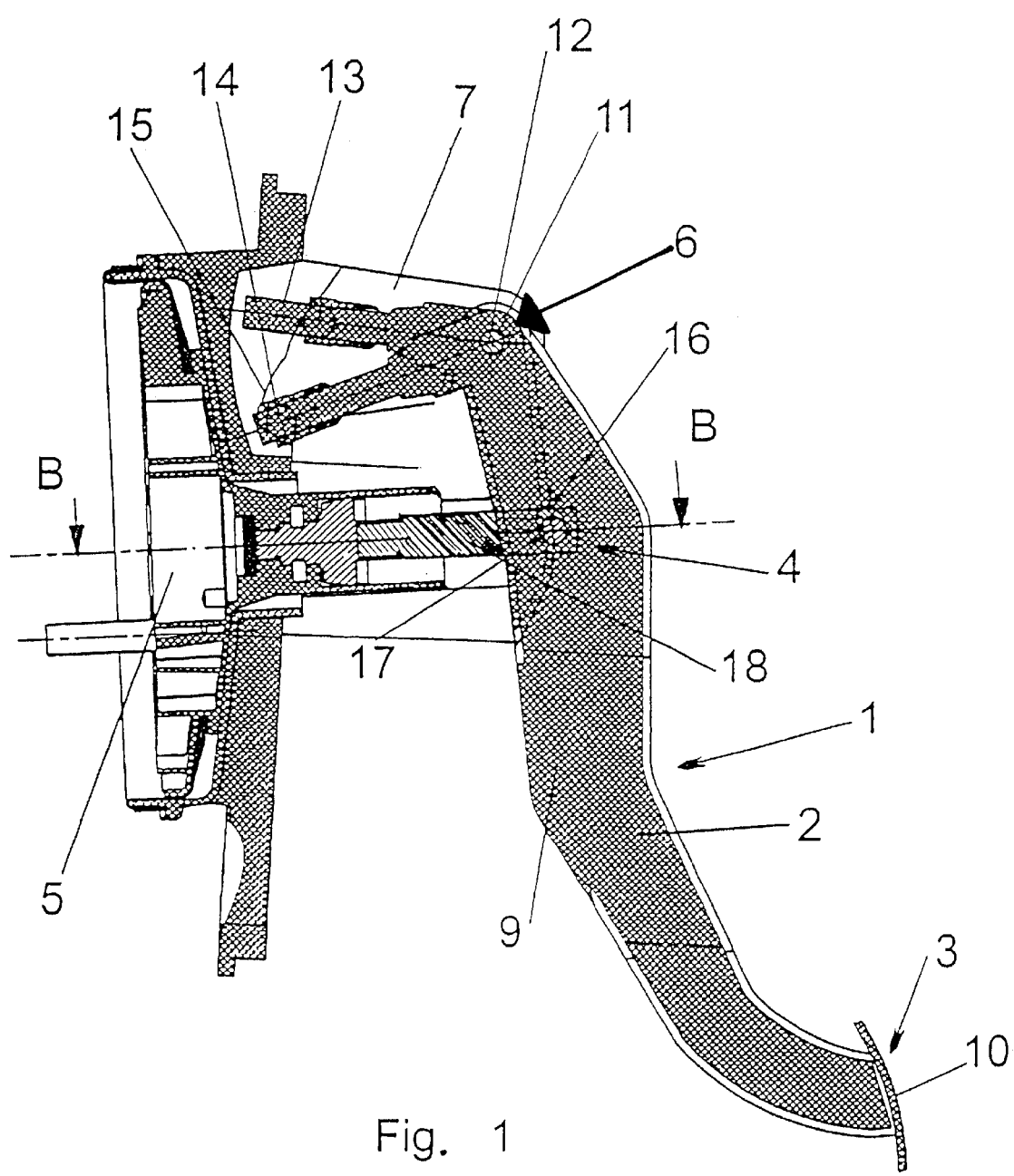
FIG. 1 is a side view of the actuating pedal according to the present invention attached to the pedal block of a motor vehicle.

Referring to the drawings in particular, the actuating pedal for the brake system of a road vehicle, which is designated by 1 in its entirety in FIG. 1, has essentially a pedal body 2, an actuating surface 3, a connection device 4 to a brake power booster module 5, and a fastening device 6 for fixing the actuating pedal 1 on a pedal block 7 of the road vehicle, which said pedal block is a rigid part of the body.

Figure 2:
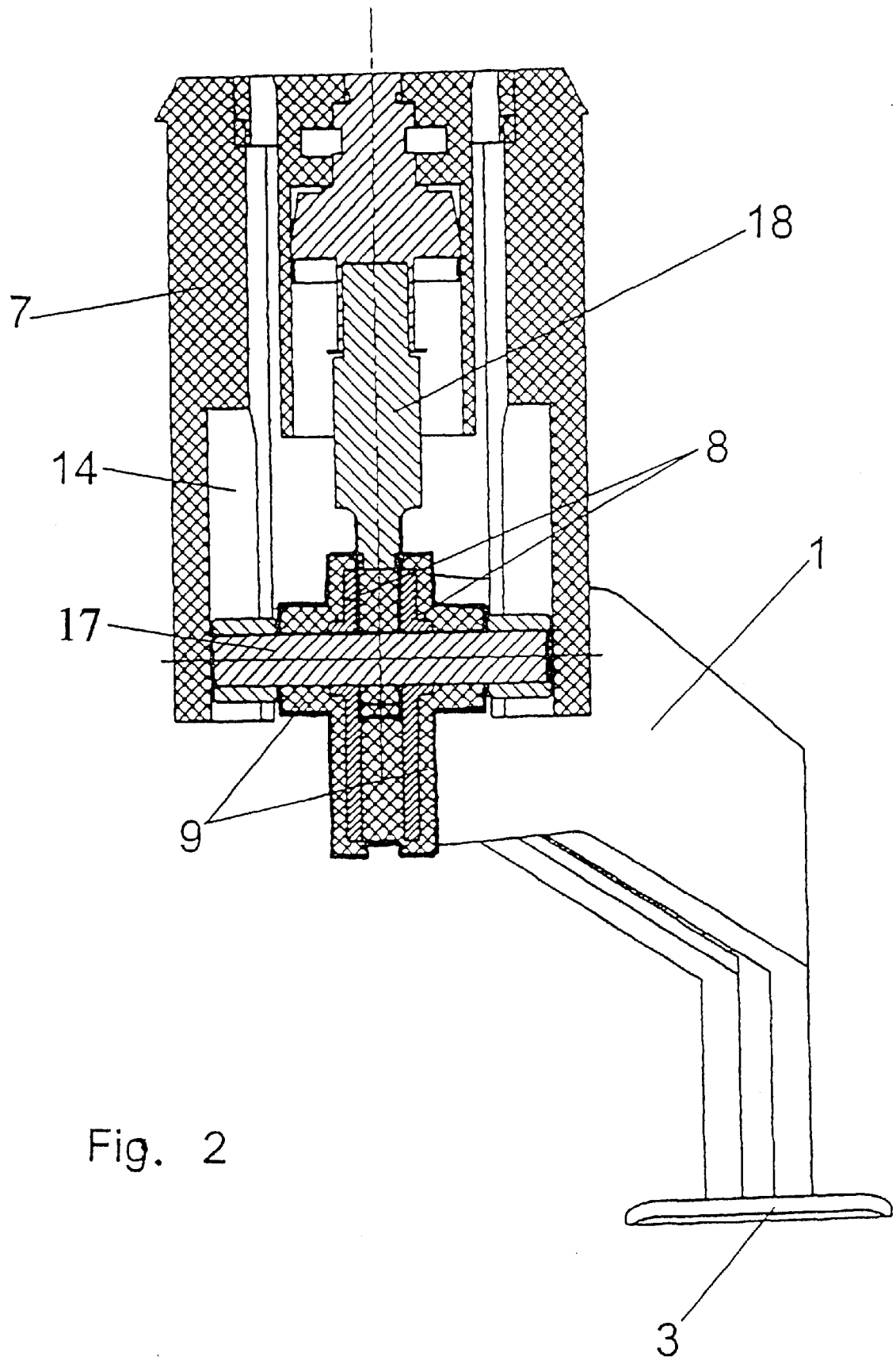
FIG. 2 is a cross-sectional view of the actuating pedal according to the present invention from FIG. 1 along line B—B.

The pedal body 2 comprises two inner metal cores 8, which are completely surrounded by a plastic jacketing 9 consisting of PA 6 or PA 6.6/GF, as is apparent from FIG. 2. The metal cores 8 have essentially a rectangular cross section in this exemplary embodiment, which is particularly advantageous with respect to the required torsional rigidity of the actuating pedal. In the area of the connection device 4, the metal cores are provided with a recess each, through which a pin element 13 of the connection device is passed through. This design of the metal cores 8 within the plastic jacketing 9 can also be seen in FIG. 2. The metal cores are preferably made of steel sheet and have a thickness of 1.5–2 mm. In conjunction with the plastic jacketing 9 surrounding the metal cores 8, this thickness is sufficient to guarantee an equal or even better torsional rigidity compared with the conventional actuating pedals known from the prior art, which are manufactured completely from steel sheet. In conjunction with the lower weight of the plastic jacketing 9, the reduced material thickness brings about, moreover, a reduction in the weight of the entire actuating pedal 1 by more than 50 wt. %.

Due to the plastic jacketing 9 being applied to the metal core 8 by injection molding, it is also possible at the same time to make the actuating surface 3 in one piece with the plastic jacketing, to provide same at the same time with an additional top layer 10 consisting of polyurethane and thus to guarantee skid resistance on the actuating surface 3.

Moreover, a mounting surface 11, which is part of the pivot bearing 12 and by which the actuating pedal 1 is pivotably fixed on the pedal block 7, is integrated in the plastic jacketing. At the top end of the actuating pedal 1, a pin element 13 is rigidly connected as an additional component of the fastening device 6 to the plastic jacketing 9 of the actuating pedal 1. The pin element 13 is provided at its front, free end facing away from the fastening device 6 with at least one pressure roller 14, which is pushed up to a maximum position to the outside by a coil spring, which is located inside the pin element 13 and is not specifically shown here. The pressure roller 14 is in contact with a curved path (that forms a cam) 15 in the assembled state of the actuating pedal 1 and the pedal block 7.

If the actuating pedal 1 is pivoted by the driver of the vehicle around the pivot bearing 12, the pressure roller 14 rolls on the curved path 15, and the compression spring arranged in the pin element 13 is compressed. The compression of the compression spring brings about the forces necessary for the restoration of the actuating pedal, and the design of the curved path 15 directly affects the value of the restoring forces and the feeling of actuation during the pivoting of the actuating pedal is thus directly affected by the shape of the curved path.

Moreover, the design of the fastening device 6 according to the present invention with integration of a spring-restoring element has the advantage that complete absence of clearance is obtained in the overall arrangement comprising the actuating pedal 1 and the pedal block 7 because the pressure roller 14 moves beyond the deepest point of the curved path 15 in the non operative position of the brake pedal 1 and a force directed opposite the spring force of the restoration of the brake power booster acts on the brake pedal 1, which force compensates the clearance that may be present due to manufacturing tolerances.

FIG. 1 also shows that the pedal body 2 is provided with an elongated hole 16 in the area of the connection device 4. A pin 17, which extends at right angles to the longitudinal axis of the pedal, is part of the connection device 4 and is rigidly connected to a connecting rod 18 which brings about the build-up of a pressure within the brake system of the road vehicle due to movement in the direction of arrow P, is inserted into the elongated hole 16. It is guaranteed by the elongated hole 16 that the connecting rod 18 can perform a perfectly linear movement and any jamming is ruled out during the pivoting of the actuating pedal 1.

While specific embodiments of the invention have been shown and described in detail to illustrate the application of the principles of the invention, it will be understood that the invention may be embodied otherwise without departing from such principles.

What is claimed is:

1. A road vehicle brake system actuating pedal for connection to a pivot bearing on a pedal block of the vehicle, pedal block being a rigid part of the vehicle body, the actuating pedal comprising:

a fastening device for fixing the actuating pedal to the pivot bearing;

a pedal body; and a pedal plate having an actuating surface, said pedal body extending from said pedal plate to the fastening device and the pivot bearing, said pedal body having at least an inner metal core and with a plastic jacketing surrounding said metal core, said inner metal core and said plastic jacketing surrounding said metal core cooperating to transmit torsional forces with said inner metal core and said plastic jacketing surrounding said metal core both together contributing to a torsional rigidity of the actuating pedal wherein said fastening device has a pin element, which has, at a free end facing away from said fastening device a spring-tensioned pressure roller, spring-tensioned pressure roller rolling on a corresponding curved path on the pedal block which is a rigid part of the body during the pivoting of the said actuating pedal around said pivot bearing of said fastening device, wherein said pressure roller is 1–2° above the deepest point of said curved path in the non-operative position of the said actuating pedal.

2. An actuating pedal in accordance with claim 1, wherein said pedal body has an elongated hole in which a connecting rod of a connection device to a brake power booster module is displaceably arranged.

3. An actuating pedal in accordance with claim 1, wherein said fastening device is made in one piece with said plastic jacketing.

4. An actuating pedal in accordance with claim 1, wherein said metal core is a steel sheet core.

5. An actuating pedal in accordance with claim 1, wherein said plastic jacketing consists of polyamide 6 or polyamide 6.6 or glass fiber.

6. An actuating pedal in accordance with claim 1, wherein said actuating surface is applied to said metal core by injection molding according to the two-component process, wherein said actuating surface has a top layer consisting of polyurethane.

7. An actuating pedal in accordance claim 1, wherein said plastic jacketing of said pedal body has attached elements for brake light switches, mounts and spring-restoring mechanisms, said attached elements being made in one piece with said plastic jacketing of said pedal body.

8. A road vehicle brake system, comprising:

a pivot bearing on a pedal block of a vehicle, the pedal block being a rigid part of the vehicle body;

an actuating pedal with a fastening device for fixing the actuating pedal to the pivot bearing, a pedal body and a pedal plate having an actuating surface, said pedal body extending from said pedal plate to the fastening device and the pivot bearing, said pedal body having at two inner metal cores and a plastic jacketing surrounding said metal cores, said inner metal cores and said plastic jacketing surrounding said metal cores cooperating to transmit torsional forces with said inner metal cores and said plastic jacketing surrounding said metal core both together contributing to a torsional rigidity of the actuating pedal, wherein said fastening device is made in one piece with said plastic jacketing, wherein said firsts device has a pin element, which has, at a free end facing away from said fastening device a spring-tensioned pressure roller, spring-tensioned pressure roller rolling on a corresponding curved path on the pedal block which is a rigid part of the body during the pivoting of the said actuating pedal around said pivot bearing of said fastening device, wherein said pressure roller is 1–2° above the deepest point of said curved path in the non-operative position of the said actuating pedal.

9. An actuating pedal in accordance with claim 8, wherein said pedal body has an elongated hole in which a connecting rod of a connection device to a brake power booster module is displaceably arranged.

10. An actuating pedal in accordance with claim 8, wherein said metal cores are each steel sheet.

11. An actuating pedal in accordance with claim 8, wherein said actuating surface is applied to said metal cores by injection molding according to the two-component process, wherein said actuating surface has a top layer consisting of polyurethane.

12. An actuating pedal in accordance claim 8, wherein said plastic jacketing of said pedal body has attached elements for brake light switches, mounts and spring-restoring mechanisms, said attached elements being made in one piece with said plastic jacketing of said pedal body.

* * * * *